US012418145B2

(12) United States Patent
Mannhold

(10) Patent No.: US 12,418,145 B2
(45) Date of Patent: Sep. 16, 2025

(54) ELECTRICAL PLUG CONNECTION HAVING A SELF-LOCKING FUNCTION

(71) Applicant: MD Elektronik GmbH, Waldkraiburg (DE)

(72) Inventor: Dimitri Mannhold, Muehldorf am Inn (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 454 days.

(21) Appl. No.: 17/964,943

(22) Filed: Oct. 13, 2022

(65) Prior Publication Data

US 2023/0132259 A1 Apr. 27, 2023

(30) Foreign Application Priority Data

Oct. 27, 2021 (DE) ..................... 10 2021 128 024.9

(51) Int. Cl.
*H01R 13/641* (2006.01)
*H01R 13/516* (2006.01)
*H01R 13/627* (2006.01)
*H01R 13/639* (2006.01)

(52) U.S. Cl.
CPC ......... *H01R 13/641* (2013.01); *H01R 13/516* (2013.01); *H01R 13/6271* (2013.01); *H01R 13/639* (2013.01)

(58) Field of Classification Search
CPC .......................... H01R 13/641; H01R 13/6272
See application file for complete search history.

(56) References Cited

U.S. PATENT DOCUMENTS 4,647,726 A * 3/1987 Blum ..................... H01R 24/64 379/438
5,176,533 A * 1/1993 Sakurai .............. H01R 13/6277 439/352
6,095,843 A 8/2000 Kaneko et al.
6,290,527 B1 * 9/2001 Takaya ................. G02B 6/3885 439/352

(Continued)

FOREIGN PATENT DOCUMENTS

DE 10110092 C1 8/2002
DE 10159197 A1 12/2002
WO WO 2021028294 A1 2/2021

*Primary Examiner* — Neil Abrams
(74) *Attorney, Agent, or Firm* — LEYDIG, VOIT & MAYER, LTD.

(57) ABSTRACT

An electrical plug connector includes a plug connector housing, a locking member and a blocking member. The locking member is movable between a locking position and an unlocking position. In the locking position, the locking member is configured to prevent the plug connection from releasing and, in the unlocking position, the locking member is configured to allow it to be released. The blocking member is displaceable between a starting position and a blocking position. In the blocking position, the blocking member is configured to prevent the locking member from assuming the unlocking position. The blocking member is configured to strike a mating plug connector housing by shifting the plug connector housing relative to the mating plug connector housing, in such a way that the mating plug connector housing displaces the blocking member from the starting position into the blocking position counter to the plugging direction.

13 Claims, 5 Drawing Sheets

(56) References Cited

U.S. PATENT DOCUMENTS

| | | | | |
|---|---|---|---|---|
| 6,527,578 | B2 * | 3/2003 | Kashiyama .......... | H01R 13/641<br>439/352 |
| 7,341,381 | B2 * | 3/2008 | Shimoji ............... | G02B 6/3893<br>385/60 |
| 8,632,352 | B2 * | 1/2014 | Wagner .............. | H01R 13/6397<br>439/352 |
| 10,199,771 | B2 * | 2/2019 | Neureiter ............. | H01R 13/639 |
| 11,276,958 | B2 * | 3/2022 | Liu ...................... | G02B 6/4261 |
| 2002/0173194 | A1 | 11/2002 | Saka et al. | |
| 2023/0093675 | A1 * | 3/2023 | Hofmann ............... | H01R 13/64<br>439/660 |

* cited by examiner

ELECTRICAL PLUG CONNECTION HAVING A SELF-LOCKING FUNCTION

CROSS REFERENCE TO RELATED APPLICATIONS

This application claims benefit to German Patent Application No. DE 10 2021 128 024.9, filed on Oct. 27, 2021, which is hereby incorporated by reference herein.

FIELD

The present invention relates to an electrical plug connector for being coupled to a corresponding mating electrical plug connector.

BACKGROUND

An electrical plug connection system as used, for example, to establish electrically conductive connections between components of a motor vehicle may comprise a plug connector and a mating plug connector that can be latched together by means of a primary locking device so as to prevent the plug connection from inadvertently releasing. As a further safety measure, the primary locking device may be blocked in a particular position using an additional component that is generally moved into position manually; this is also referred to as connector position assurance (CPA).

Moreover, the plug connection system may comprise a secondary locking device that ensures that the plug connector and the mating plug connector can be fully plugged together, i.e., latched together by means of the primary locking device, only when one or more electrically conductive contact members, for example in the form of outer conductors, have been correctly positioned in the plug connector and mating plug connector. A secondary locking device of this kind may also be used to secure the contact member(s) against slipping in the plug connector and mating plug connector.

SUMMARY

In an embodiment, the present invention provides an electrical plug connector including a plug connector housing, a locking member and a blocking member. The plug connector housing is configured to receive at least one electrically conductive contact member, and is connectable to a mating plug connector housing configured to receive at least one electrically conductive mating contact member by shifting the plug connector housing relative to the mating plug connector housing in a plugging direction to establish a plug connection. The locking member is disposed on the plug connector housing so as to be movable between a locking position and an unlocking position, wherein, in the locking position, the locking member is configured to prevent the plug connection from releasing, and wherein, in the unlocking position, the locking member is configured to allow the plug connection to be released. The blocking member is disposed on the plug connector housing so as to be displaceable between a starting position and a blocking position, wherein the blocking member, in the blocking position, is configured to prevent the locking member from assuming the unlocking position, and wherein the blocking member is configured to strike the mating plug connector housing by the shifting of the plug connector housing relative to the mating plug connector housing, in such a way that the mating plug connector housing displaces the blocking member from the starting position into the blocking position counter to the plugging direction

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
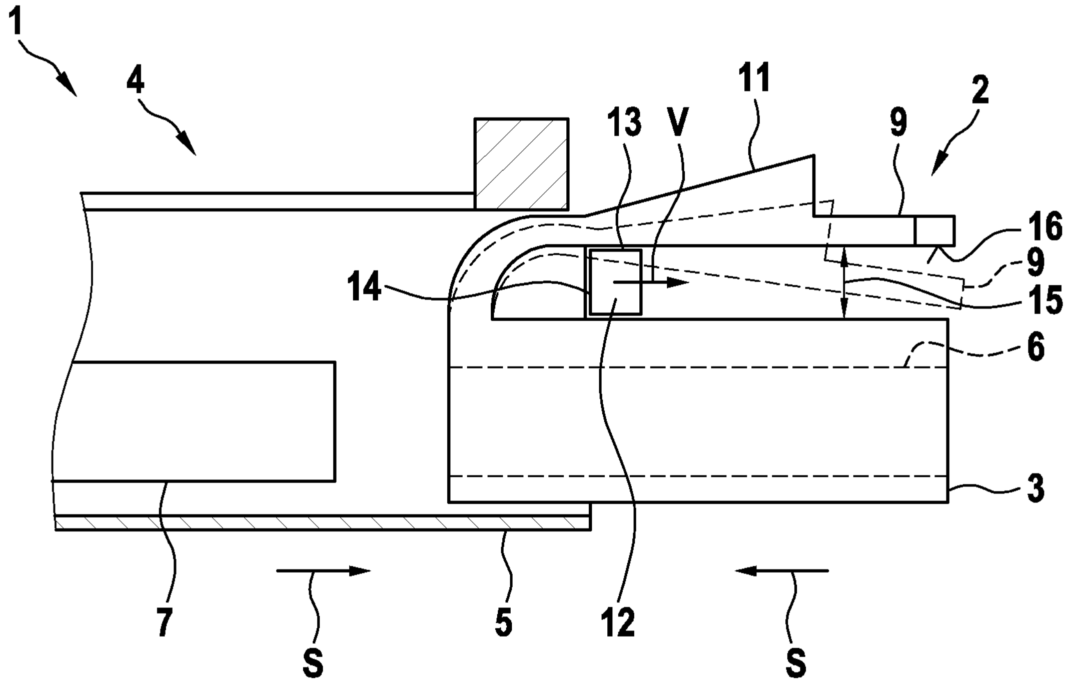
FIG. 1 is a side view of an electrical plug connection system comprising a plug connector according to an embodiment example of the invention in the unlatched state.

In an embodiment, the present invention provides an electrical plug connection that does not require any additional, for example manual, assembly step to block the primary locking device.

In an embodiment, the present invention provides an electrical plug connector. The plug connector comprises a plug connector housing for receiving at least one electrically conductive contact member, wherein the plug connector housing can be connected to a mating plug connector housing for receiving at least one electrically conductive mating contact member, which is to be connected to the contact member in an electrically conductive manner, to establish a plug connection. The plug connector further comprises a locking member, which is borne on the plug connector housing so as to be movable between a locking position and an unlocking position and is configured to prevent the plug connection from releasing when in the locking position and to allow it to do so when in the unlocking position, and a blocking member, which is borne on the plug connector housing so as to be displaceable between a starting position and a blocking position. The blocking member is configured, when in the blocking position, to prevent the locking member from assuming the unlocking position. The blocking member is furthermore configured to strike the mating plug connector housing when the plug connector housing is shifted relative to the mating plug connector housing, in such a way that the mating plug connector housing displaces the blocking member from the starting position into the blocking position counter to the plugging direction.

For example, the contact member may be received by the plug connector housing and/or the mating contact member may be received by the mating plug connector housing. The contact member and mating contact member may be interconnectable in an electrically conductive manner by establishing the plug connection.

Without limiting the scope of the invention in any way, embodiments of the invention may, inter alia, be considered to be based on the concepts and knowledge described in the following.

As mentioned at the outset, special housing locks (also referred to as CPA) may be used in plug connector assemblies that are common in, for example, the automotive industry. They serve to ensure that the housing of the plug connector or mating plug connector is properly connected to the relevant electrical contacts. The position of the housing lock may be secured using a separate blocking member, which generally has to be moved into a corresponding blocking position by hand after the plugging operation; this represents an additional step during assembly and requires a certain degree of training.

Using the approach described above and below, the assembly of the plug connection can be considerably simplified in that the blocking member is moved into the desired position by the plugging operation itself. An additional assembly step after the plugging operation can thus be omitted, in particular an additional manual assembly step, which may accordingly be time-consuming and prone to error.

A "contact member" and "mating contact member" may, for example, be understood to be a pin-like and/or bush-like metal conductor that can be connected to a cable in an electrically conductive manner. By way of example, the contact member and mating contact member may comprise an outer conductor and an inner conductor arranged coaxially therewith. The contact member and mating contact member may be insertable into one another, for example.

The locking member may be configured to interact frictionally and/or interlockingly with an accordingly shaped latching region of the mating plug connector housing when in the locking position so as to prevent the plug connection from separating. In the unlocking position, the locking member may, for example, be fully moved out of the latching region.

The movements of the locking member and of the blocking member may be suitably coordinated with one another in time so as to ensure that the blocking member blocks the locking member only when the locking member is latched in the mating plug connector housing.

It is not entirely necessary for the blocking member in the blocking position to prohibit all movement of the locking member. For example, slight movement of the locking member toward the unlocking position may still be possible in the blocking position as long as it is ensured that the locking member cannot be moved as far as into the unlocking position.

In principle, the locking member is blocked by the blocking member blocking at least part of a possible movement range of the locking member, the blocking member being supported against the plug connector housing. To release the blocking, the blocking member may, for example, be moved counter to the plugging direction into a third position in which the blocking member is no longer blocking the path of the locking member, such that the locking member can be moved back into the unlocking position. Alternatively, the blocking member may also be simply removed from the plug connector housing in order to release the blocking, for example by being withdrawn from the plug connector housing counter to the plugging direction. The blocking member may be moved into position and removed using a tool, for example a screwdriver, and/or by hand.

By way of example, the blocking member may be borne so as to be displaceable along a displacement axis that is parallel to the plugging direction. In particular, the blocking member may be a part produced in a single piece, for example an injection-molded part or an additively manufactured part.

The plug connector may additionally comprise a secondary locking mechanism, which is configured to cause the plug connector housing and the mating plug connector housing to be connectable to establish the plug connection only when the contact member received by the plug connector housing is arranged in a predetermined position in and/or on the plug connector housing.

Alternatively or additionally, the mating plug connector may have one such secondary locking mechanism.

According to one embodiment, the locking member may be pivotally borne on the plug connector housing and be movable by being pivoted toward the plug connector housing into the unlocking position. In this case, the blocking member may have at least one blocking stop that is configured to limit a pivot range of the locking member when in the blocking position and to enable said pivot range when in the starting position. For this purpose, the locking member may, for example, be formed as an arm borne at one side on the plug connector housing. The locking member may be hingedly borne at one of its (arm) ends or be rigidly connected to the plug connector housing. In this case, a free (arm) end of the locking member may project further from the plug connector housing in the locking position than in the unlocking position. For example, the blocking member may be arranged so as to be displaceable at least in part in a gap between the locking member and the plug connector housing, the gap becoming smaller when the locking member moves from the locking position into the unlocking position. The blocking member may be configured such that the blocking stop is arranged in the gap in the blocking position, i.e., is located between the locking member and the plug connector housing, as a result of which the locking member cannot be pivoted, or at least cannot be fully pivoted, toward the plug connector housing. In the starting position, however, the blocking stop may be arranged outside the gap.

According to one embodiment, the blocking stop may be formed by a resiliently bendable finger. For example, the finger may be oriented transversely to the displacement axis of the blocking member when in the unbent state. In this case, in the blocking position a free end of the finger may be directed toward the locking member, for example toward a stop face and/or a projection on the locking member (see below). Owing to this embodiment, a force that in some circumstances acts on the blocking stop when the locking member is moved from the locking position into the unlocking position can be converted into a controlled resilient deformation of the blocking stop. In the process, the finger may be resiliently deformable in a defined manner by a component of the force acting in the plugging direction and/or by a component of the force acting transversely to the plugging direction. This prevents damage to the locking member and/or to the blocking member.

According to one embodiment, the blocking stop in the blocking position may be opposite a stop face of the locking member such that the locking member together with the stop face strikes the blocking stop when the locking member is pivoted toward the plug connector housing. Conversely, it is possible for the blocking stop to be pushed away from the stop face when in the starting position such that the locking member can be pivoted into the unlocking position. In the blocking position, the stop face and the blocking stop may touch each other or be separated from one another by a small gap. The effect of this is that the locking member in the locking position has no clearance, or only a small clearance, when the blocking member is pushed into the blocking position.

According to one embodiment, the stop face may be formed by two projections that project from opposite longitudinal sides of the locking member. In this case, the blocking member may have two blocking stops, which are each opposite one of the projections in the blocking position. The two projections may, for example, be two individual lugs or be formed by a thickened portion on both sides of the locking member. This allows the locking member to the supported against the blocking member on both sides and thus in a particularly stable manner.

According to one embodiment, the locking member may be resiliently bendable by being pivoted toward the plug connector housing such that the locking member in the unlocking position is preloaded by a spring force directed toward the locking position. As a result, the locking member reverts to the locking position by itself when let go, without a separate spring mechanism being needed for this purpose. It is possible that the locking member is not preloaded in the locking position.

According to one embodiment, the blocking member may have at least one displacement stop, which is configured to strike an end of the mating plug connector housing facing the plug connector housing when the plug connector housing is shifted relative to the mating plug connector housing. The displacement stop may be a stop that is spatially separate from the blocking stop(s). In particular, the displacement stop may be oriented in a different direction from the blocking stop(s). For example, the displacement stop may have a stop face oriented orthogonally or slightly obliquely to the plugging direction. By way of example, the displacement stop may be formed such that it protrudes into a front part of the plug connector housing in the blocking position, said front part being insertable into the mating plug connector housing, and is pushed away from the front part in the starting position.

According to one embodiment, the blocking member may have at least two displacement stops, which are configured to strike different locations on the end of the mating plug connector housing facing the plug connector housing when the plug connector housing is shifted relative to the mating plug connector housing. By way of example, the two displacement stops may be symmetrical with one another in relation to a displacement axis of the blocking member. As a result, the blocking member can be prevented from tilting when it is displaced from the starting position into the blocking position.

According to one embodiment, the blocking member may have a base plate, which is displaceably borne on the plug connector housing and has a recess for receiving an end portion of the locking member in the unlocking position. The recess may, for example, be formed by a central opening in the base plate. The blocking stop(s) and/or the displacement stop(s) may be fastened to the base plate. The recess may extend at least in part between the two blocking stops and/or the two displacement stops. For example, the end portion of the locking member may be received by the recess when the locking member is moved into the unlocking position and the blocking member is displaced into the starting position and/or into an intermediate position between the starting position and the blocking position. This allows the plug connector to have a particularly compact design.

According to one embodiment, the plug connector housing may have a housing body and two wall portions projecting from the housing body, said wall portions each having a first latching receptacle and a second latching receptacle. The blocking member may be guided between the two wall portions and have, for each of the wall portions, a latching member that may be arranged so as to be displaceable between the first latching receptacle and the second latching receptacle of the relevant wall portion. In this case, the latching member may be latched in the first latching receptacle when the blocking member is displaced into the starting position, and may be latched in the second latching receptacle when the blocking member is displaced into the blocking position. The housing body may be configured to receive the contact member or a plurality thereof. The two wall portions may be arranged opposite one another on the housing body. It is possible for the two wall portions to be interconnected to form a stirrup-shaped structure through which the locking member and/or the blocking member may be guided. For example, the wall portions may have suitable guides, for example in the form of grooves or channels, for guiding the blocking member. The guides may, for example, be configured to receive outer edge regions of the base plate of the blocking member. By way of example, a “latching receptacle” may be understood as a depression, protrusion, or opening that is formed in/on the relevant wall portion and can be latched with the relevant latching member. The first and second latching receptacles may be configured as a connected geometry or as two individual geometries or segments. By way of example, a “latching member” may be understood as a resiliently spring-loaded member that is configured to engage interlockingly and/or frictionally in the relevant first and second latching receptacles. This embodiment allows for a particularly space-saving latching mechanism for latching the blocking member. The latching of the blocking member ensures that the blocking member is not inadvertently displaced and/or that a particular resistance first has to be overcome in order to remove the blocking member.

According to one embodiment, the blocking member may be configured, when in the blocking position, to minimize an axial clearance between the plug connector housing and the mating plug connector housing when the plug connector housing is connected to the mating plug connector housing to establish the plug connection. “Axial clearance” may be understood as a clearance in and/or counter to the plugging direction. For example, the blocking member in the blocking position may be latchable to the plug connector housing such that the blocking member is clamped between the end of the mating plug connector housing facing the plug connector housing, in particular the end face thereof, and the second latching receptacle by a defined force in the axial direction, such that the two housings are slightly pressed apart from one another counter to the plugging direction. In this way, undesirable axial movements of the two housings relative to one another in the plugged state can be avoided.

According to one embodiment, the plug connector housing may have at least one groove in which a lug of the blocking member is displaceably arranged. In this case, the lug may strike a first end of the groove in the starting position and/or strike a second end of the groove in the blocking position. In other words, the lug may be freely displaceable in the groove between the first end and the second end whereas displacement of the lug beyond the first end, for example in the plugging direction, and/or displacement of the lug beyond the second end, for example counter to the plugging direction, is either impossible or possible only using excessively high force. In this way, it can be ensured that the blocking member cannot be readily displaced beyond the starting position and/or the blocking position. The groove(s) and the lug(s) may also be configured to laterally guide the blocking member during displacement.

The figures are merely schematic and are not to scale. Identical reference signs denote identical or identically functioning features in the various drawings.

FIG. 1 shows an electrical plug connection system 1 comprising an electrical plug connector 2 having a plug connector housing 3, and a mating electrical plug connector 4 having a mating plug connector housing 5. In the plug connector housing 3 there is arranged an electrically conductive contact member 6, which is to be connected, in an electrically conductive manner, to an electrically conductive mating contact member 7 received by the mating plug connector housing 5. For this purpose, the plug connector housing 3 and the mating plug connector housing 5 can be connected to establish a plug connection 8 by being shifted relative to one another in a plugging direction S (see FIG. 2). In this case, the contact member 6 and the mating contact member 7 may be inserted into one another in part, thereby producing an electrically conductive plug connection.

The plug connection system 1 may also comprise two or more contact members 6 or mating contact members 7, i.e., it may be double-pole or multi-pole.

The plug connector 2 further comprises a locking member 9, which is borne on the plug connector housing 3 so as to be movable between a locking position and an unlocking position.

In this example, the locking member 9 is, at one of its ends, pivotally borne on the plug connector housing 3 and can be moved into the unlocking position by pivoting its free end toward the plug connector housing 3. FIG. 1 shows the unlocking position in dashed lines.

Figure 2:
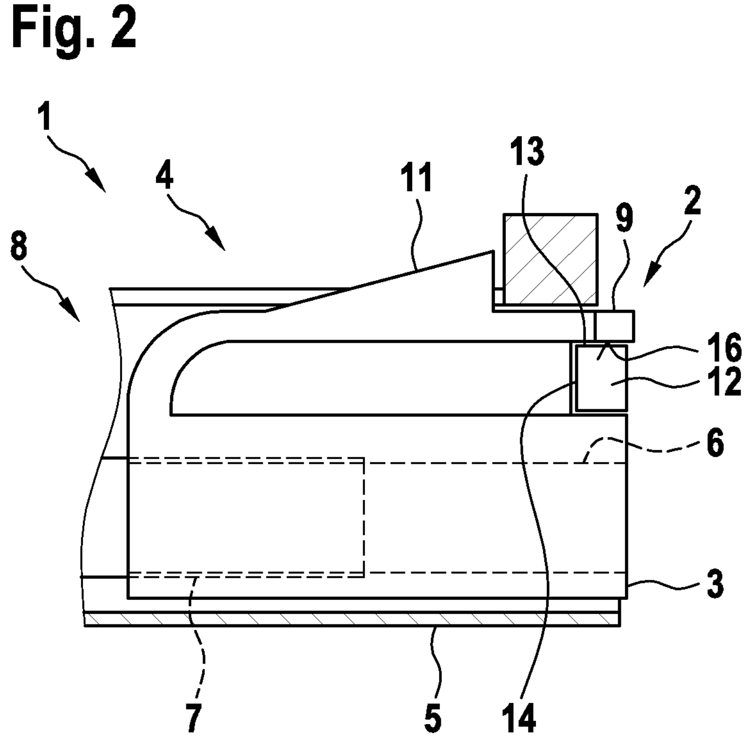
FIG. 2 is a side view of the plug connection system from FIG. 1 in the latched state.

As can be seen in FIG. 2, the plug connector housing 3 and the mating plug connector housing 5 are latched together by way of the locking member 9 in the locking position such that the plug connection 8 can no longer be readily released.

In this example, the locking member 9 is formed as a resiliently bendable arm that can be preloaded toward the plug connector housing 3 by being pressed down such that the locking member 9 reverts from the unlocking position to the locking position by itself when let go. In the unlocking position, the plug connector housing 3 and the mating plug connector housing 5 may be inserted into one another entirely, for example as far as a stop, and separated again.

Alternatively, the locking member 9 may also be borne on the plug connector housing 3 so as to be pivotable between the unlocking position and the locking position by means of a mechanical joint. In this case, the preload of the locking member 9 may be generated, for example, by means of a separate spring.

By way of example, the locking member 9 may have a latching wedge 11 that slides over a front edge of the mating plug connector housing 5 facing the plug connector housing 3 when the plug connector housing 3 and the mating plug connector housing 5 are brought together. The effect of this is that the locking member 9 is pivoted toward the plug connector housing 3 transversely to the plugging direction S; in other words, the more the locking member is bent, the more the plug connector housing 3 and the mating plug connector housing 5 are brought together. Owing to the preload of the resiliently bent locking member 9, the latching wedge 11 may then latch by itself in an accordingly shaped latching region of the mating plug connector housing 5 (see FIG. 2). The resulting plug connection 8 may thus be released only by moving the locking member 9 back into the unlocking position by applying force.

To prevent this, for example for safety reasons, the plug connection system 1 comprises a blocking member 12, which is borne on the plug connector housing 3 so as to be displaceable in a displacement direction V between a starting position (see FIG. 1) and a blocking position (see FIG. 2). The displacement direction V and the plugging direction S may run in parallel with one another, for example.

The blocking member 12 may have a blocking stop 13 and a displacement stop 14 and be configured such that, together with the displacement stop 14, it strikes the mating plug connector housing 5 when the plug connector housing 3 and the mating plug connector housing 5 are plugged together, for example strikes an end of the mating plug connector housing 5 facing the plug connector housing 3, as a result of which the blocking member 12 is displaced by the mating plug connector housing 5 from the starting position into the blocking position counter to the plugging direction S.

The blocking stop 13 may be formed such that it adjusts a pivot range 15 of the locking member 9 when in the blocking position such that the locking member 9 is no longer pivotable into the unlocking position.

For example, the blocking stop 13 may adjust the pivot range 15 by, on one side, being opposite a stop face 16 of the locking member 9 when in the blocking position and, on the other side, being supported by the plug connector housing 3. In the starting position, however, the blocking stop 13 may be entirely pushed away from the stop face 16 (see FIG. 1).

Therefore, the plugging operation alone causes the locking member 9 to be moved initially from the locking position into the unlocking position and then from the unlocking position back into the locking position and to be blocked in the locking position at the end of the plugging operation. A self-locking function of this kind makes assembling the plug connection system 1 simpler since the locking member 9 need not be specifically pushed into the unlocking position, for example with a thumb, and no additional manual step is needed in order to lock the latched locking member 9 by means of a blocking member.

Figure 3:
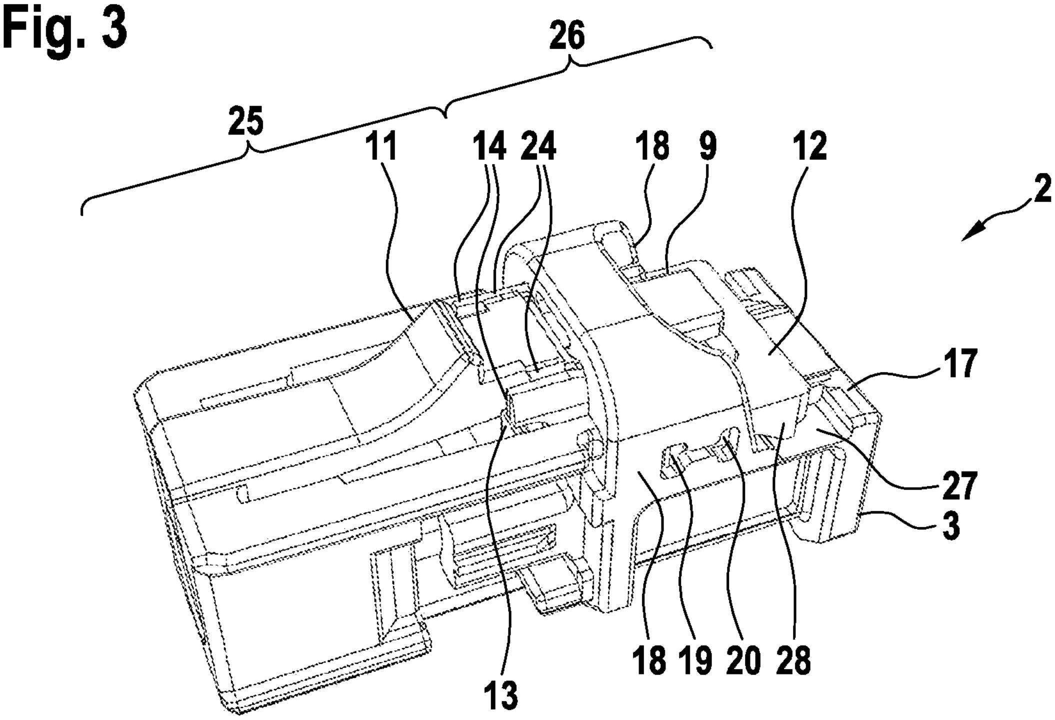
FIG. 3 is a perspective view of an electrical plug connector according to an embodiment example of the invention in a starting position.

FIG. 3 shows a plug connector 2 whose plug connector housing 3 has a housing body 17, in which the contact member 6 may be received, and two wall portions 18 projecting from the housing body 17, the blocking member 12 being guidable between the two wall portions 18. The two wall portions 18 may be interconnected to form a stirrup-shaped structure. The locking member 9 may be guided through said structure in addition to the blocking member 12.

Each of the wall portions 18 may have a first latching receptacle 19 and a second latching receptacle 20, which are used to latch the blocking member 12 on the plug connector housing 3 in the starting position or blocking position.

As shown in FIG. 7 to FIG. 10, the blocking member 12 may have one latching member 21 for each of the wall portions 18, i.e., a total of two latching members 21. The latching members 21 may be arranged on opposite sides of the blocking member 12.

Each of the latching members 21 may, for example, have a snap-in lug 22 that is arranged so as to be displaceable between the first latching receptacle 19 and the second latching receptacle 20 of the corresponding wall portion 18. Accordingly, the latching receptacles 19, 20 may each be formed by a depression or an opening in the corresponding wall portion 18, the snap-in lug 22 being able to interlockingly engage in the first latching receptacle 19 in the starting position and being able to interlockingly engage in the second latching receptacle 20 in the blocking position.

Figure 7:
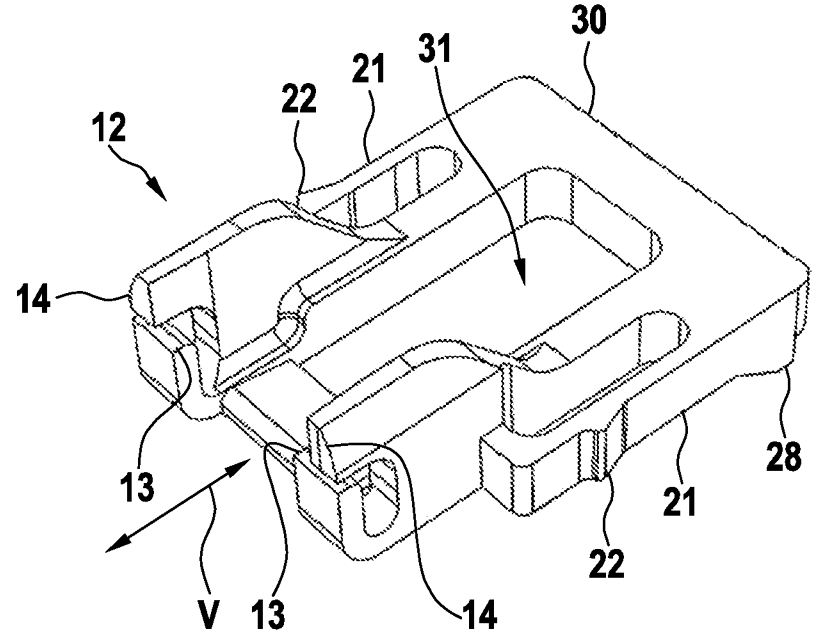
FIG. 7 is a perspective view of a blocking member of the plug connector from FIG. 3.
Figure 8:
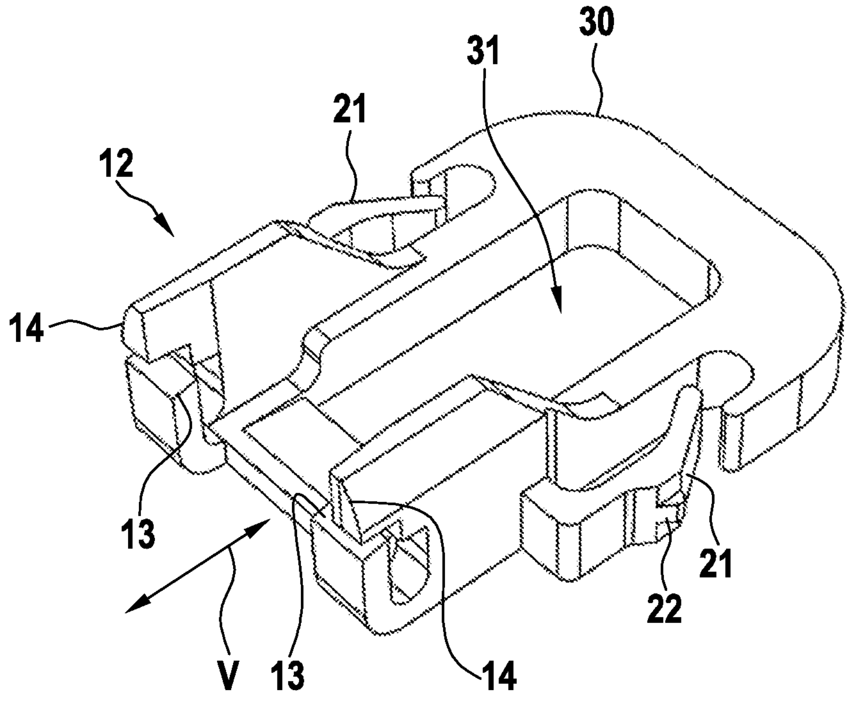
FIG. 8 is a perspective view of a blocking member according to an embodiment example of the invention.
Figure 9:
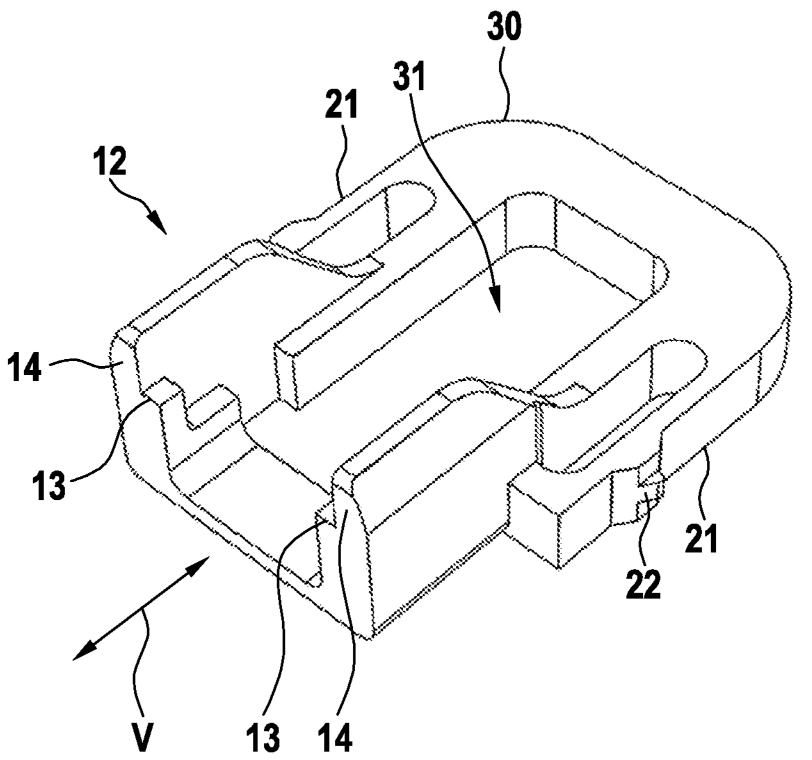
FIG. 9 is a perspective view of a blocking member according to an embodiment example of the invention.
Figure 10:
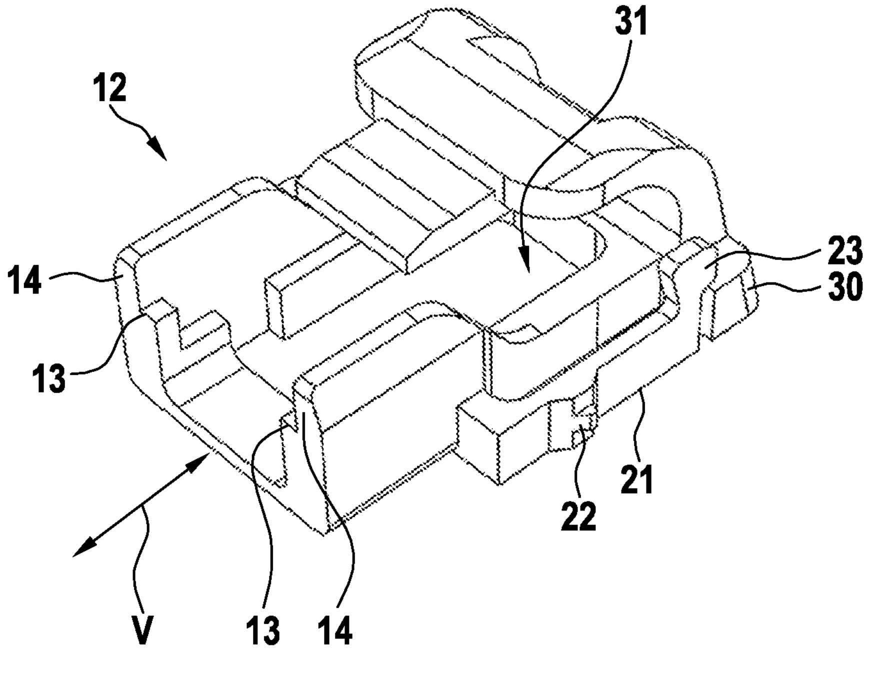
FIG. 10 is a perspective view of a blocking member according to an embodiment example of the invention.

The latching members 21 may be configured in a suitable manner to be resiliently spring-loaded, for example in the form of a bendable finger or snap hook fastened on one side, as shown in FIG. 8 and FIG. 10, or in the form of a bendable strip fastened on two sides, as shown in FIG. 7 and FIG. 9.

For simple manual actuation, the latching member 21 may, for example, have a specially shaped grip portion 23 for a finger (see FIG. 10).

Figure 4:
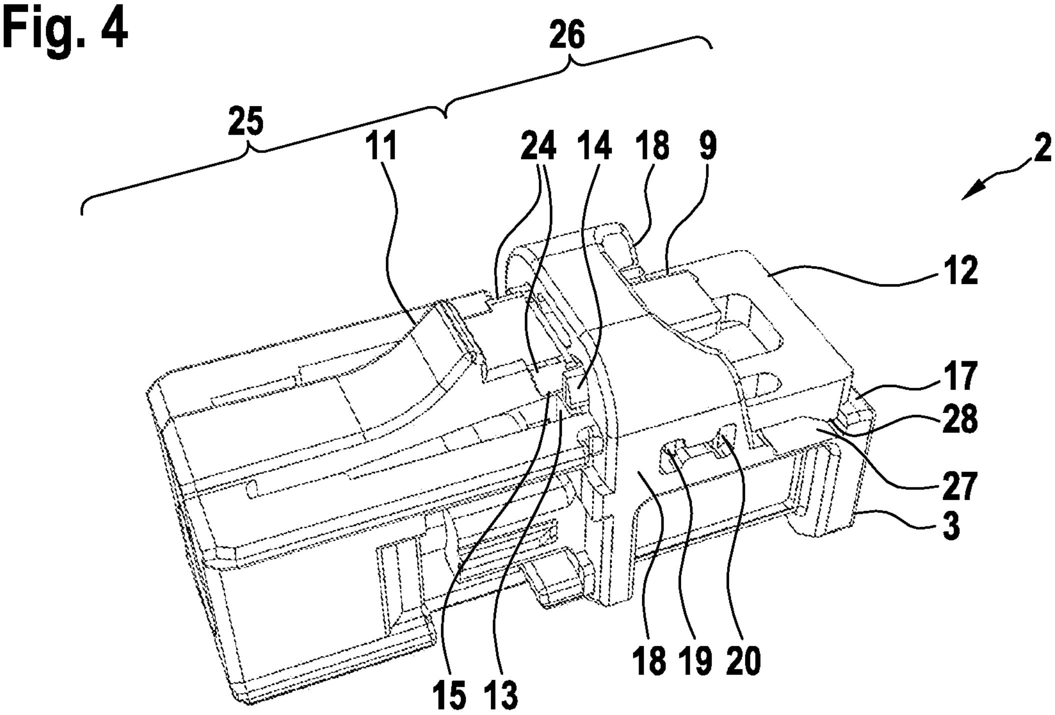
FIG. 4 is a perspective view of the plug connector from FIG. 3 in a blocking position.
Figure 5:
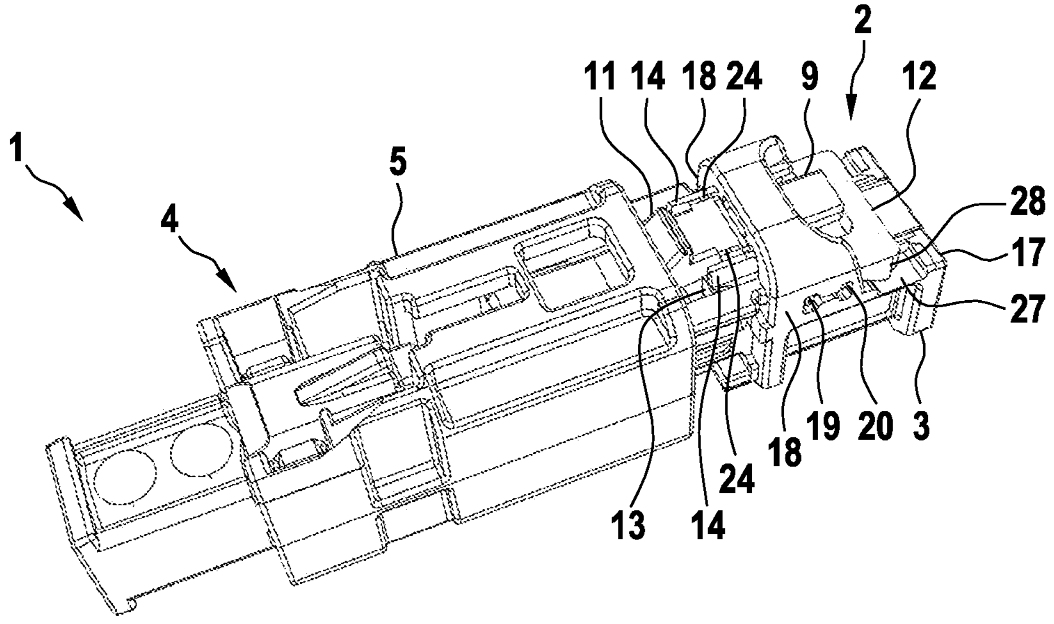
FIG. 5 is a perspective view of an electrical plug connection system having the plug connector from FIG. 3 in the unlatched state.
Figure 6:
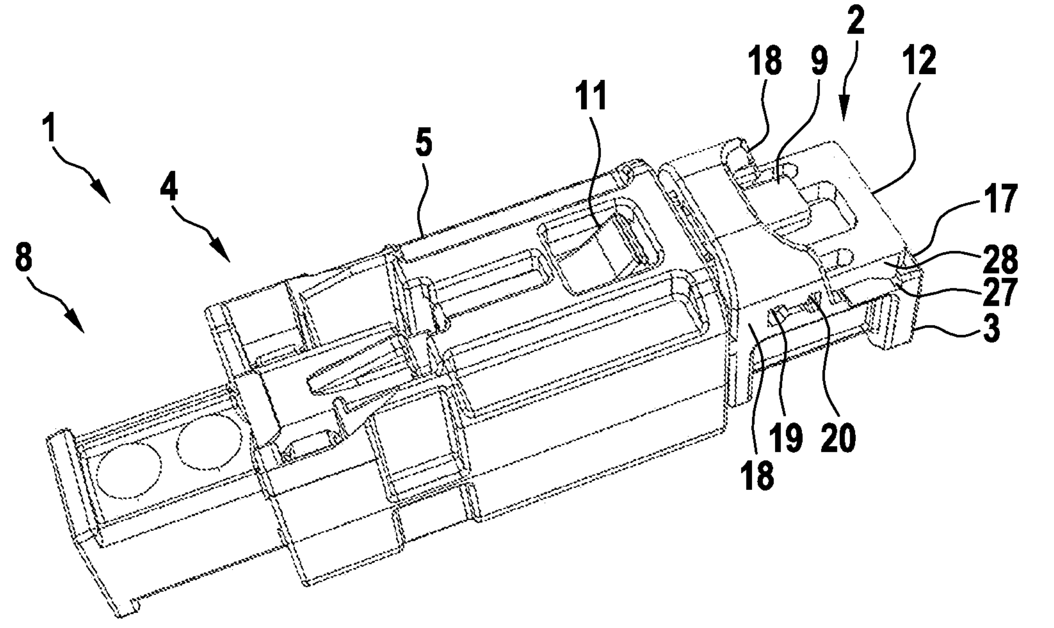
FIG. 6 is a perspective view of the plug connection system from FIG. 5 in the latched state.

As can be clearly seen in FIG. 3 and FIG. 4, the locking member 9 may have two projections 24 that may project from opposite longitudinal sides of the locking member 9, i.e., transversely to the longitudinal direction thereof, and provide the stop face 16. Accordingly, the blocking member 12 may have two blocking stops 13 that are each opposite one of the projections 24 in the blocking position and thus block the locking member 9 (see FIG. 4). In the starting position, however, the blocking stops 13 may be entirely pushed away from the relevant projection 24 (see FIG. 3).

In addition, the blocking member 12 may have two separate displacement stops 14 that each protrude into a front part 25 of the plug connector housing 3 in the starting position. By contrast with a rear part 26 of the plug connector housing 3, the front part 25 may be insertable into the mating plug connector housing 5. In the blocking position, the two displacement stops 14 may be arranged entirely in the rear part 26 (see FIG. 4).

In the example shown in FIG. 3 and FIG. 4, the plug connector housing 3 is additionally formed having two parallel grooves 27, in each of which there engages a lug 28 that projects from the blocking member 12 and is displaceable in the relevant groove 27. The grooves 27 may thus be formed such that the lugs 28 strike a first end of the relevant groove 27 in the starting position and strike a second end of the relevant groove 27 opposite the first end in the blocking position. In this way, it can be ensured that the blocking member 12 cannot be displaced beyond the starting position or blocking position or cannot be readily removed from the plug connector 2.

FIG. 7 to FIG. 10 show possible embodiments of the blocking member 12 by way of example.

For example, the blocking member 12 may have a base plate 30, which may be received by an accordingly flattened region of the plug connector housing 3 and may be displaceably borne thereon.

The base plate 30 may have a central recess 31 for receiving a free end of the locking member 9. A possible pivot range 15 of the locking member 9 may be enlarged by means of the recess 31, for example.

The blocking stops 13, the displacement stops 14, and/or the latching members 21 may be fastened to the base plate 30.

For example, the blocking stops 13 may each be formed as a resiliently bendable finger that, when in the unbent state, may stand proud from the base plate 30 substantially transversely to the displacement direction V of the blocking member 12 (see FIG. 7 and FIG. 8). Alternatively, the blocking stops 13 may be configured as rigid blocks (see FIG. 9 and FIG. 10).

The displacement stops 14 may, for example, be formed by different part-surfaces of one and the same end face of the blocking member 12 (see FIG. 9 and FIG. 10). Alternatively, the displacement stops 14 may be configured as individual, solid arms (see FIG. 7 and FIG. 8). The displacement stops 14 thus strike different locations on the end of the mating plug connector housing 5 facing the plug connector housing 3 when the plug connector housing 3 and the mating plug connector housing 5 are plugged together.

When the plug connection system 1 is in a pre-latching position, in which the plug connector housing 3 and the mating plug connector housing 5 may be inserted into one another in part, the blocking member 12 may, for example, be pushed toward the mating plug connector housing 5 as far as a stop. In addition, and as described above, in the pre-latching position the blocking member 12 may protrude in part into a plugging region of the plug connector 2, i.e., the front part 25 of the plug connector housing 3. During the plugging operation, the blocking member 12 is, for example, then pushed by an end face of the mating plug connector housing 5 counter to the plugging direction S into the blocking position, which may correspond to a final-latching position of the plug connection system 1. The blocking member 12 is displaced at the same time as the plugging movement of the two housings 3, 5. In the final-latching position, the blocking member 12 thus blocks the locking member 9. In other words, in the final-latching position the blocking member 12 cannot be pushed from the blocking position back into the starting position since the path thereto is blocked by the mating plug connector housing 5.

The latching receptacles 19, 20 may, for example, be arranged such as to compensate for an axial clearance of the blocking member 12 in the plugging direction S. By way of example, in the pre-latching and/or final-latching position the blocking member 12 may be axially clamped in a defined manner between the end face of the mating plug connector housing 5 and the first latching receptacle 19. Therefore, in the pre-latching and/or final-latching position, in which the two housings 3, 5 are not latched together in an entirely clearance-free manner by means of the locking member 9 in some circumstances, the blocking member 12 clamped in the aforementioned way may slightly press the two housings 3, 5 counter to the plugging direction S such as to reduce or eliminate the axial clearance between said two housings.

Lastly, it should be noted that terms such as "having," "comprising," etc., do not exclude other elements or steps, and indefinite articles such as "a," "an," or "one" do not exclude a multiplicity. Moreover, it is pointed out that features or steps that have been described with reference to one of the above embodiment examples may also be used in combination with features or steps that have been described with reference to others of the above embodiment examples. Reference signs in the claims should not be construed as limiting.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Plug connection system
2 Plug connector
3 Plug connector housing
4 Mating plug connector
5 Mating plug connector housing
6 Contact member
7 Mating contact member
8 Plug connection
9 Locking member
11 Latching wedge
12 Blocking member
13 Blocking stop
14 Displacement stop
15 Pivot range
16 Stop face
17 Housing body
18 Wall portion
19 First latching receptacle
20 Second latching receptacle
21 Latching member
22 Snap-in lug
23 Grip portion
24 Projection
25 Front part
26 Rear part
27 Groove
28 Lug
30 Base plate
31 Recess
S Plugging direction
V Displacement direction

What is claimed is:

1. An electrical plug connector, comprising:

a plug connector housing configured to receive at least one electrically conductive contact member, wherein the plug connector housing is connectable to a mating plug connector housing configured to receive at least one electrically conductive mating contact member by shifting the plug connector housing relative to the mating plug connector housing in a plugging direction to establish a plug connection;

a locking member disposed on the plug connector housing so as to be movable between a locking position and an unlocking position, wherein, in the locking position, the locking member is configured to prevent the plug connection from releasing, and wherein, in the unlocking position, the locking member is configured to allow the plug connection to be released; and a blocking member disposed on the plug connector housing so as to be displaceable between a starting position and a blocking position, wherein the blocking member, in the blocking position, is configured to prevent the locking member from assuming the unlocking position, and wherein the blocking member is configured to strike the mating plug connector housing by the shifting of the plug connector housing relative to the mating plug connector housing, in such a way that the mating plug connector housing displaces the blocking member from the starting position into the blocking position counter to the plugging direction, wherein the blocking member has a base plate, which is displaceably disposed on the plug connector housing and has a recess configured to receive an end portion of the locking member in the unlocking position.

2. The plug connector according to claim 1, wherein the locking member is pivotally disposed on the plug connector housing so as to be moveable into the unlocking position by being pivoted toward the plug connector housing, wherein the blocking member has at least one blocking stop, wherein the at least one blocking stop, in the blocking position, is configured to limit a pivot range of the locking member, and wherein, in the starting position, the at least one blocking stop is configured to enable the pivot range.

3. The plug connector according to claim 2, wherein the at least one blocking stop is formed by a resiliently bendable finger.

4. The plug connector according to claim 2, wherein the at least one blocking stop, in the blocking position, is opposite a stop face of the locking member such that the locking member together with the stop face is configured to strike the at least one blocking stop by the pivoting of the locking member toward the plug connector housing.

5. The plug connector according to claim 4, wherein the stop face is formed by two projections that project from opposite longitudinal sides of the locking member, and wherein the blocking member has two blocking stops, which are each opposite one of the projections in the blocking position.

6. The plug connector according to claim 2, wherein the locking member is resiliently bendable by being pivoted toward the plug connector housing such that the locking member, in the unlocking position, is preloaded by a spring force directed toward the locking position.

7. The plug connector according to claim 1, wherein the blocking member has at least one displacement stop, which is configured to strike an end of the mating plug connector housing facing the plug connector housing by the shifting of the plug connector housing relative to the mating plug connector housing.

8. The plug connector according to claim 7, wherein the blocking member has at least two displacement stops, which are configured to strike different locations on the end of the mating plug connector housing facing the plug connector housing by the shifting of the plug connector housing relative to the mating plug connector housing.

9. The plug connector according to claim 1, wherein the plug connector housing has a housing body and two wall portions projecting from the housing body, the wall portions each having a first latching receptacle and a second latching receptacle, wherein the blocking member is guided between the two wall portions and has, for each of the wall portions, a latching member arranged so as to be displaceable between the first latching receptacle and the second latching receptacle of the respective wall portion, wherein the latching member is configured to be latched in the first latching receptacle by the blocking member being displaced into the starting position, and wherein the latching member is configured to be latched in the second latching receptacle by the blocking member being displaced into the blocking position.

10. The plug connector according to claim 1, wherein the blocking member, in the blocking position, is configured to minimize an axial clearance in the plug connection between the plug connector housing and the mating plug connector housing.

11. The plug connector according to claim 1, wherein the plug connector housing has at least one groove in which a lug of the blocking member is displaceably arranged, wherein the lug, in the starting position, is configured to strike a first end of the groove and/or, in the blocking position, is configured to strike a second end of the groove.

12. An electrical plug connector, comprising:

a plug connector housing configured to receive at least one electrically conductive contact member, wherein the plug connector housing is connectable to a mating plug connector housing configured to receive at least one electrically conductive mating contact member by shifting the plug connector housing relative to the mating plug connector housing in a plugging direction to establish a plug connection;

a locking member disposed on the plug connector housing so as to be movable between a locking position and an unlocking position, wherein, in the locking position, the locking member is configured to prevent the plug connection from releasing, and wherein, in the unlocking position, the locking member is configured to allow the plug connection to be released; and a blocking member disposed on the plug connector housing so as to be displaceable between a starting position and a blocking position, wherein the blocking member, in the blocking position, is configured to prevent the locking member from assuming the unlocking position, and wherein the blocking member is configured to strike the mating plug connector housing by the shifting of the plug connector housing relative to the mating plug connector housing, in such a way that the mating plug connector housing displaces the blocking member from the starting position into the blocking position counter to the plugging direction, wherein the locking member is pivotally disposed on the plug connector housing so as to be moveable into the unlocking position by being pivoted toward the plug connector housing, wherein the blocking member has at least one blocking stop, wherein the at least one blocking stop, in the blocking position, is configured to limit a pivot range of the locking member, and wherein, in the starting position, the at least one blocking stop is configured to enable the pivot range, wherein the at least one blocking stop, in the blocking position, is opposite a stop face of the locking member such that the locking member together with the stop face is configured to strike the at least one blocking stop by the pivoting of the locking member toward the plug connector housing, and wherein the stop face is formed by two projections that project from opposite longitudinal sides of the locking member, and wherein the blocking member has two blocking stops, which are each opposite one of the projections in the blocking position.

13. An electrical plug connector, comprising:

a plug connector housing configured to receive at least one electrically conductive contact member, wherein the plug connector housing is connectable to a mating plug connector housing configured to receive at least one electrically conductive mating contact member by shifting the plug connector housing relative to the mating plug connector housing in a plugging direction to establish a plug connection;

a locking member disposed on the plug connector housing so as to be movable between a locking position and an unlocking position, wherein, in the locking position, the locking member is configured to prevent the plug connection from releasing, and wherein, in the unlocking position, the locking member is configured to allow the plug connection to be released; and a blocking member disposed on the plug connector housing so as to be displaceable between a starting position and a blocking position, wherein the blocking member, in the blocking position, is configured to prevent the locking member from assuming the unlocking position, and wherein the blocking member is configured to strike the mating plug connector housing by the shifting of the plug connector housing relative to the mating plug connector housing, in such a way that the mating plug connector housing displaces the blocking member from the starting position into the blocking position counter to the plugging direction, wherein the plug connector housing has a housing body and two wall portions projecting from the housing body, the wall portions each having a first latching receptacle and a second latching receptacle, wherein the blocking member is guided between the two wall portions and has, for each of the wall portions, a latching member arranged so as to be displaceable between the first latching receptacle and the second latching receptacle of the respective wall portion, wherein the latching member is configured to be latched in the first latching receptacle by the blocking member being displaced into the starting position, and wherein the latching member is configured to be latched in the second latching receptacle by the blocking member being displaced into the blocking position.

* * * * *